A. PAULSON.
LOCKING DEVICE FOR DEMOUNTABLE VEHICLE WHEELS.
APPLICATION FILED OCT. 16, 1916.
1,259,438. Patented Mar. 12, 1918.
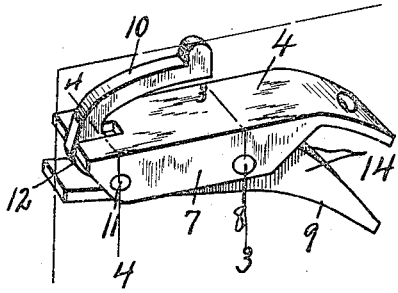
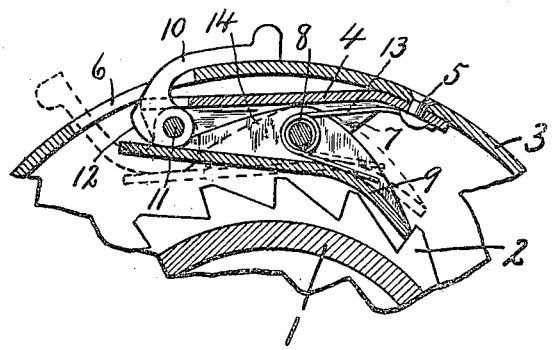
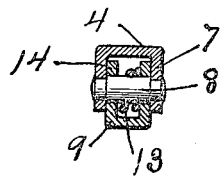
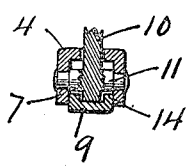

UNITED STATES PATENT OFFICE.

ALFRED PAULSON, OF GENEVA, NEW YORK, ASSIGNOR TO NATIONAL WIRE WHEEL WORKS, INC., OF GENEVA, NEW YORK, A CORPORATION OF NEW YORK.

LOCKING DEVICE FOR DEMOUNTABLE VEHICLE-WHEELS.

1,259,438.  Specification of Letters Patent.  Patented Mar. 12, 1918.

Application filed October 16, 1916. Serial No. 125,902.

*To all whom it may concern:*

Be it known that I, ALFRED PAULSON, a citizen of the United States of America, and resident of Geneva, in the county of Ontario, in the State of New York, have invented new and useful Improvements in Locking Devices for Demountable Vehicle-Wheels, of which the following, taken in connection with the accompanying drawings, is a full, clear, and exact description.

This invention relates to certain improvements in locking devices for relatively rotatable parts as applied more particularly to the inner and outer hubs of demountable vehicle wheels.

In devices of this character, the cap is usually provided with a circumferential series of teeth adapted to be engaged by a pawl on the spoke-receiving hub to hold the cap in its adjusted position for retaining the hubs in operative relation or in interlocking connection one with the other to rotate in unison, and at the same time permitting the outer hub carrying the rim and spokes to be removed as a unit without disturbing the position of the inner hub or its bearings.

The main object of my present invention is to provide a simple locking device capable of being manufactured and sold as a unit to be applied to the outer hub for engagement with the ratchet wheel.

Other objects and uses relating to specific parts of the locking device will be brought out in the following description.

In the drawings—

Figure 1 is a perspective view of the detached locking device ready to be applied to the outer spoke-receiving hub.

Fig. 2 is a sectional view of portions of the outer hub and cap and my improved locking device in operative position.

Figs. 3 and 4 are transverse sectional views taken, respectively, on lines 3—3 and 4—4, Fig. 1.

The cap, as —1—, is adapted to be secured in any well-known manner, preferably by screwing, upon the outer end of the inner shaft-receiving hub and is provided with a circumferential series of teeth. The outer spoke-receiving hub, as —3—, is concentric with the cap —1— and surrounds the circumferential series of teeth —2— in spaced relation thereto.

The locking device forming the subject-matter of my invention comprises a base plate —4— extending circumferentially of the hub —3— and secured at one end to the inner face thereof by rivet —5— or equivalent fastening means, the opposite end being extended into close proximity to a radial opening —6— in the hub for a purpose presently described.

The base plate —4— is provided with opposite longitudinally extending flanges —7— to which is pivoted at —8— a circumferentially extending pawl having one end deflected inwardly for engagement with the teeth —2— and its opposite end extended across the inner side of the opening —6— for engagement by a suitable cam lever —10—.

This cam lever is pivoted at —11— to the ends of the flanges —7— adjacent the opening —6— and is provided with a cam face —12— adapted to be brought into engagement with the corresponding end of the pawl —9— for forcing the same from its locking position against the action of a retracting spring —13— which tends to force the inwardly deflected end of the pawl into engagement with the teeth —2—.

The lever —10— is so constructed as to lie against the outer face of the hub —3— when in position for releasing the pawl, but may be rocked by hand to the position shown by dotted lines for tripping the pawl and holding it in its tripped position when it is desired to unscrew the cap in removing the outer hub with the spokes and rim carried thereby.

The pawl and base plate are both made of sheet metal stampings, the pawl being also provided with opposite longitudinal flanges —14— overlapping upon the inner faces of the flanges —7— and perforated to receive the pivotal pin —8—.

The cam end of the lever —10— is interposed between the flanges —7— and —14— of both parts —4— and —9—, but, of course, is only pivoted to the flanges —7—, thus leaving the pawl —9— free to rock about the axis of its pivotal pin —8— as the lever —10— is moved in one direction or the other.

The flanges of both the base plate —4— and pawl —9— serve to reinforce the same, thus permitting the use of comparatively light sheet metal without sacrificing the strength necessary to hold the cap —1— against unscrewing when adjusted for use.

By pivoting both the pawl and cam lever to the base plate, the entire locking device may be made up as a unit and quickly secured in operative position on the outer hub by one or more rivets, as —5—, the lever —10— passing through the slot —6— in the hub serving to hold the locking device against turning about the axis of the pivot —5—, thereby securely holding said locking device in place by means of a single rivet, as —5—, if necessary.

In order to remove the outer hub from the inner hub, it is simply necessary to throw the cam lever —10— to the position indicated by dotted lines, whereupon the cap —1— may be unscrewed and the outer hub with the spokes and rim carried thereby may be withdrawn endwise outwardly in the usual manner for demountable wheels of this class.

What I claim is:

1. In a locking device for demountable vehicle wheels, a base plate, a pawl pivoted to the base plate and spring-pressed to its holding position, and a lever also pivoted to the base plate and provided with means for tripping the pawl when moved in one direction.

2. In a vehicle hub, the combination with two relatively rotatable parts, one disposed within the other, of a locking device for said parts comprising a base-plate secured to one part, a pawl pivoted to the base plate and spring-pressed to engage the other part, and a lever pivoted to one of said parts and adapted for tripping the pawl.

3. In a vehicle hub, the combination with a spoke-receiving hub and a cap within the hub, said cap provided with a circumferential series of teeth, of a locking device comprising a base-plate secured to the hub, a pawl pivoted to the base-plate and spring-pressed into engagement with said teeth, and a cam lever for tripping the pawl.

4. In a vehicle hub, the combination with a spoke-receiving hub and a cap within the hub, said cap provided with a circumferential series of teeth, of a locking device comprising a base-plate secured to the hub, a pawl pivoted to the base-plate and spring-pressed into engagement with said teeth, and a cam lever pivoted to the base-plate and extending outward through an opening through the spoke-receiving hub for hand operation to trip the pawl.

5. In a vehicle hub, the combination with a spoke-receiving hub and a cap within the hub, said cap provided with a circumferential series of teeth, of a locking device comprising a base-plate secured to and within the outer hub, a pawl mounted on the base-plate for engaging the cap, and a cam lever pivoted to the base-plate and adapted to trip the pawl when moved in one direction.

In witness whereof I have hereunto set my hand this 30th day of September, 1916.

ALFRED PAULSON.

Witnesses:
GLENN A. PAGE,
C. V. BLACK.